(12) United States Patent
Belisario et al.

(10) Patent No.: US 7,937,698 B2
(45) Date of Patent: May 3, 2011

(54) EXTENSIBLE MECHANISM FOR AUTOMATICALLY MIGRATING RESOURCE ADAPTER COMPONENTS IN A DEVELOPMENT ENVIRONMENT

(75) Inventors: Ella Belisario, Boca Raton, FL (US); Jason Nathaniel Lacombe, Berkeley, CA (US); Adriana M. Loghin, Boca Raton, FL (US); Pravesh Kirit Patel, Cary, NC (US); Vadim S. Semenov, San Francisco, CA (US); Suraksha Vidyarthi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 11/832,821

(22) Filed: Aug. 2, 2007
(Under 37 CFR 1.47)

(65) Prior Publication Data

US 2009/0037898 A1 Feb. 5, 2009

(51) Int. Cl.
*G06F 9/44* (2006.01)
(52) U.S. Cl. ........ 717/169; 717/168; 717/170; 717/120; 717/148
(58) Field of Classification Search .................. 717/169, 717/120
See application file for complete search history.

(56) References Cited

U.S. PATENT DOCUMENTS

| | | | | |
|---|---|---|---|---|
| 6,687,745 B1 * | 2/2004 | Franco et al. | ................ | 709/219 |
| 6,721,777 B1 * | 4/2004 | Sharma | ................ | 718/101 |
| 6,976,061 B1 | 12/2005 | Sharma | | |
| 7,036,110 B2 * | 4/2006 | Jeyaraman | .................. | 717/120 |
| 7,058,950 B2 * | 6/2006 | Jeyaraman | .................. | 718/104 |
| 7,480,916 B2 * | 1/2009 | Beisiegel et al. | ............. | 719/311 |
| 7,493,628 B2 * | 2/2009 | Potter et al. | .................. | 719/328 |
| 7,509,429 B2 * | 3/2009 | Tankov et al. | ................. | 709/228 |
| 7,657,658 B2 * | 2/2010 | Tankov et al. | ................. | 709/250 |
| 2003/0074217 A1 | 4/2003 | Beisiegel et al. | | |
| 2003/0110315 A1 | 6/2003 | Upton | | |
| 2003/0182426 A1 * | 9/2003 | Hapner et al. | ................. | 709/226 |
| 2003/0182459 A1 * | 9/2003 | Jeyaraman | .................... | 709/310 |
| 2003/0204740 A1 | 10/2003 | Shapiro et al. | | |
| 2003/0236923 A1 * | 12/2003 | Jeyaraman et al. | ........... | 709/318 |
| 2004/0015974 A1 * | 1/2004 | Jeyaraman | .................... | 718/104 |
| 2004/0034859 A1 * | 2/2004 | Potter et al. | .................... | 719/310 |
| 2004/0078495 A1 | 4/2004 | Mousseau et al. | | |
| 2006/0080435 A1 | 4/2006 | Tankov et al. | | |
| 2006/0143222 A1 | 6/2006 | Daniel | | |
| 2006/0165034 A1 | 7/2006 | Pecsy | | |
| 2007/0011194 A1 | 1/2007 | Gurevich | | |

OTHER PUBLICATIONS

Poon, "Upgrading/Migrating pre-J2EE-1.4 Applications to J2EE-1.4", Sep. 2005, Sun Microsystems, JavaChina, pp. 1-56.

* cited by examiner

*Primary Examiner* — Thomas K Pham
(74) *Attorney, Agent, or Firm* — Yee & Associates, P.C.; Prentiss W. Johnson

(57) ABSTRACT

The illustrative embodiments provide a computer implemented method, apparatus, and computer usable program code for automatically migrating a resource adapter component. In one embodiment, information describing a development and runtime environment associated with a first version of a resource adapter is collected by a migration framework to form real environment information. A specification of requirements associated with a second version of the resource adapter is received from the second version of the resource adapter to form a required environment specification. The migration framework compares the real environment information with the required environment specification. In response to identifying incompatibilities between the real environment information and the required environment specification, the migration framework automatically executes a migration scenario to resolve the incompatibilities.

20 Claims, 6 Drawing Sheets

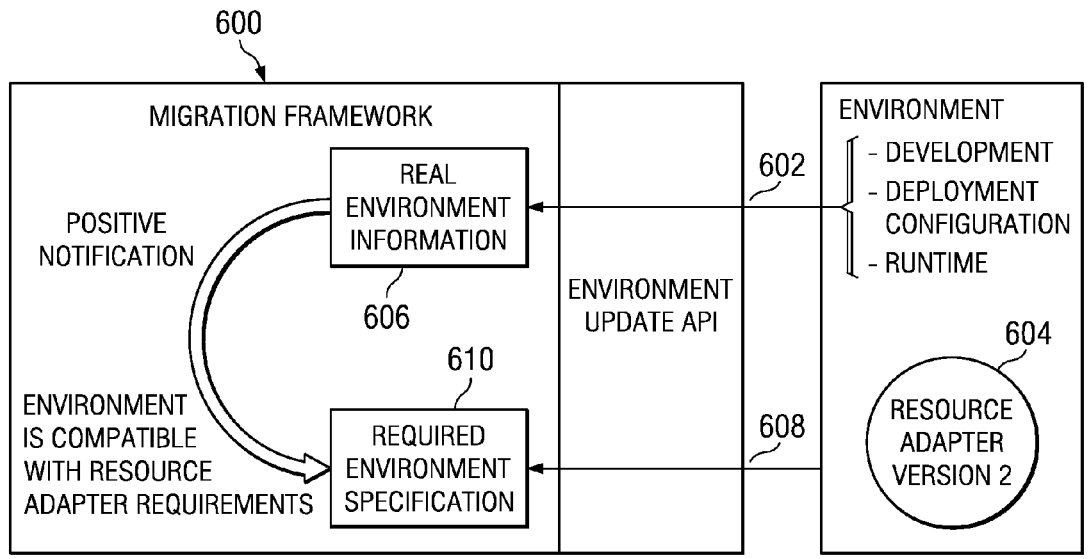
FIG. 6
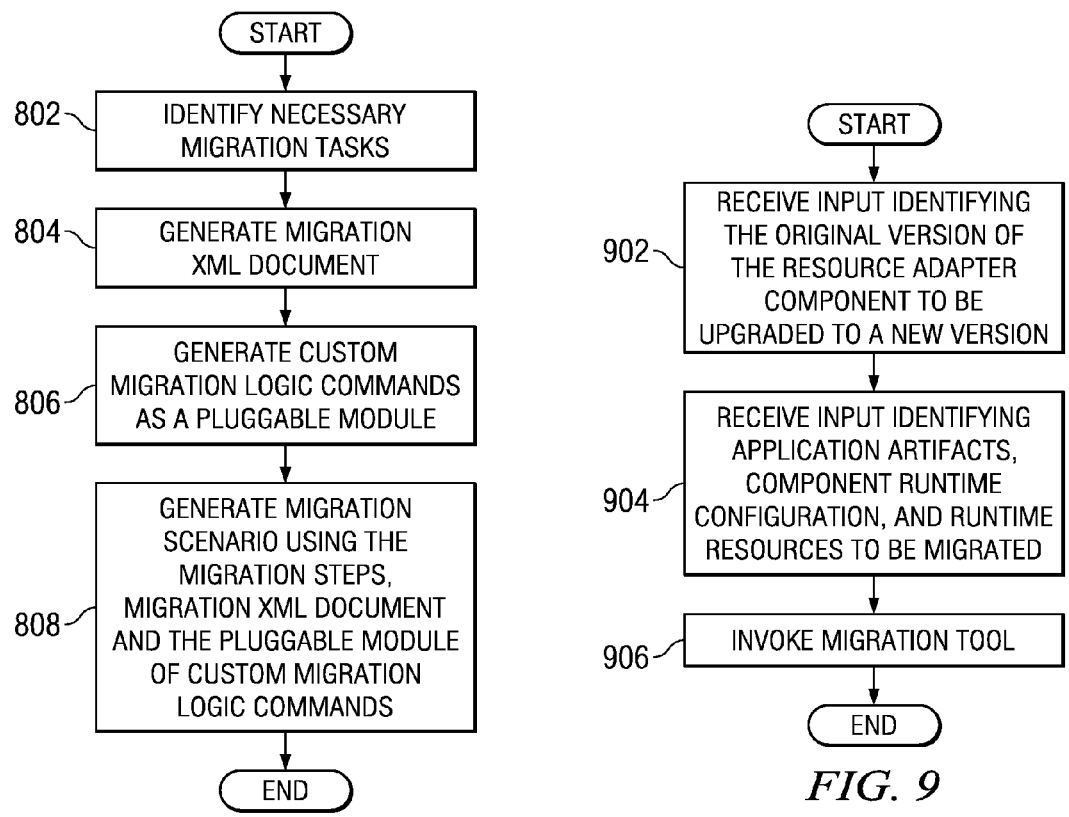
FIG. 8
FIG. 9

EXTENSIBLE MECHANISM FOR AUTOMATICALLY MIGRATING RESOURCE ADAPTER COMPONENTS IN A DEVELOPMENT ENVIRONMENT

BACKGROUND OF THE INVENTION

1. Field of the Invention

The present invention is related generally to a data processing system and in particular to a method and apparatus for migrating resource adapter components. More particularly, the present invention is directed to a computer implemented method, apparatus, and computer usable program code for providing a common framework to automatically migrate project development and runtime artifacts to a new version of a resource adapter.

2. Description of the Related Art

A resource adapter is a system level software component that an application uses to connect to an enterprise information system (EIS). The resource adapter plugs into an application server and provides connectivity between the EIS, application services, and the enterprise application components. The resource adapter is frequently updated to a new version of the resource adapter.

Resource adapters are frequently updated to support additional EIS connectivity features, to support a new EIS version, in response to changes to the external resource configuration utilized by the resource adapter, due to improvements in resource adapter internal interfaces, in response to a request to support a newer version of a Java Connectivity Architecture (JCA), or any combination of these reasons.

Currently, when a resource adapter component is upgraded to a different version, a resource adapter developer creates the new version of the resource adapter component, identifies changes to application artifacts, component runtime configurations, and component runtime resources that are required to support use of the new version of the resource adapter. The resource adapter developer manually creates instructions to the user that explain migration changes.

In this solution, a programmer manually creates an individual migration procedure for each new resource adapter version. This solution provides a generic procedure that requires additional user documentation and software support to adjust for the differences and customizations on different computer systems. However, to implement the migration, a user follows the instructions and manually performs migration on applications artifacts, component runtime configuration, and component runtime resources to use the new version of the resource adapter component. Thus, this solution can be time consuming, labor intensive, burdensome, and expensive for both the developer and the user implementing the update to the newer version.

In another solution, the resource adapter developer creates a tool to automate migration for the user. In this solution, the resource adapter logic for a newer version of a resource adapter provides custom migration logic to carry out the migration procedure. Thus, a user can invoke the tool to perform changes automatically for each adapter. Although this solution saves the user some time and effort, this solution continues to require each developer to solve the same problem of creating a migration tool for each new resource adapter version.

In addition, the migration logic source code increases with each new resource adapter version because each newer version of the adapter may include migration logic capable of migrating older versions of the resource adapter. In other words, if there have been four versions of a resource adapter, a newer version of the adapter may include up to four versions of the migration tool for migrating each of the older versions to the newer version. This results in the program code becoming increasingly voluminous, complex, and expensive to create as each newer version of the resource adapter is created.

SUMMARY OF THE INVENTION

The illustrative embodiments provide a computer implemented method, apparatus, and computer usable program code for automatically migrating a resource adapter component. In one embodiment, information describing a development and runtime environment associated with a first version of a resource adapter is collected by a migration framework to form real environment information. A specification of requirements associated with a second version of the resource adapter is received from the second version of the resource adapter to form a required environment specification. The migration framework compares the real environment information with the required environment specification. In response to identifying incompatibilities between the real environment information and the required environment specification, the migration framework automatically executes a migration scenario to resolve the incompatibilities.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a block diagram illustrating a migration framework for confirming migration is not required in accordance with an illustrative embodiment;

FIG. 8 is a flowchart illustrating a process for generating a migration scenario in accordance with an illustrative embodiment;

FIG. 9 is a flowchart illustrating a process for invoking the migration framework in accordance with an illustrative embodiment;

DETAILED DESCRIPTION OF THE PREFERRED EMBODIMENT

Figure 1:
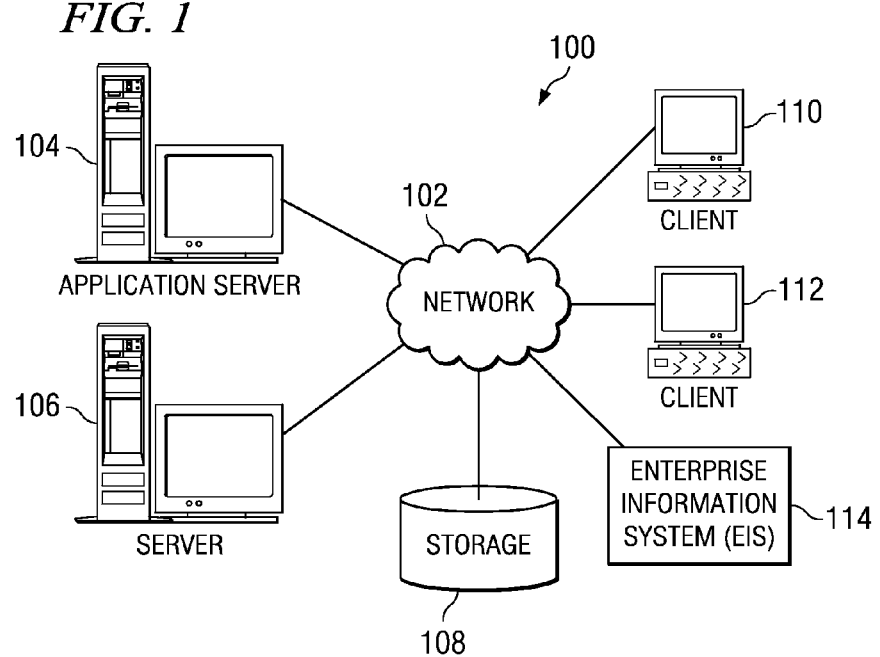
FIG. 1 is a pictorial representation of a network of data processing systems in which illustrative embodiments may be implemented.
Figure 2:
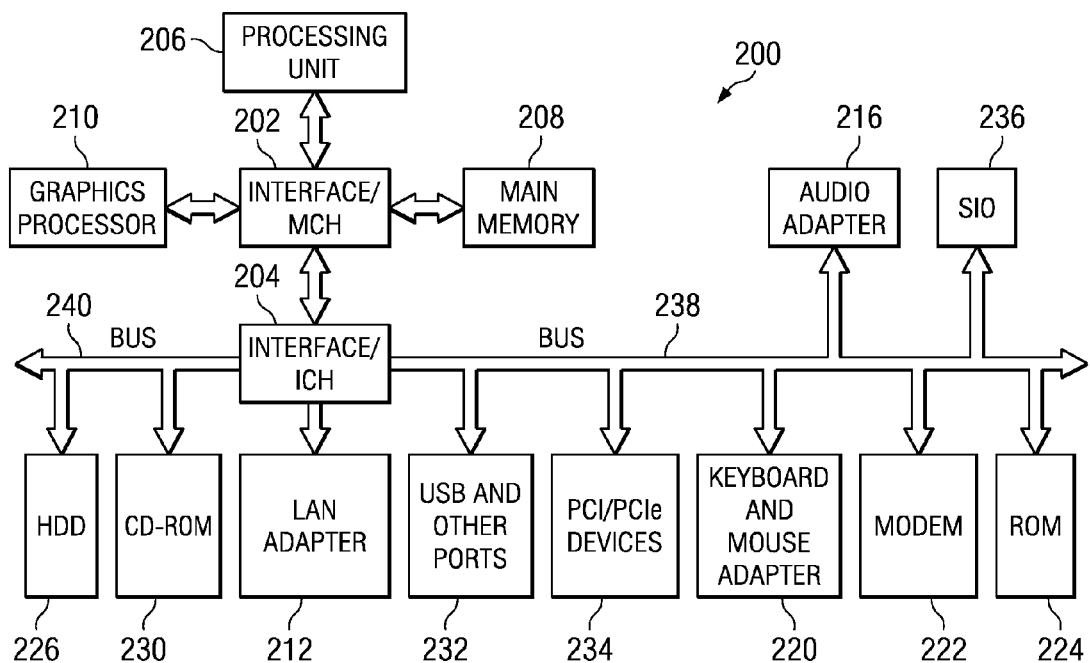
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, application server 104 and server 106 connect to network 102 along with storage unit 108. Application server 104 provides applications and application services to clients 110 and 112. Application server 104 includes a resource adapter for permitting application server 104 to connect to Enterprise information system 114. Application server 104 may be implemented in any type of known or available application server, including, but not limited to, a Java™ 2 Enterprise Edition (J2EE) application server or an IBM WebSphere® application server.

Clients 110 and 112 connect to network 102. Clients 110 and 112 may be, for example, personal computers or network computers. In the depicted example, application server 104 and/or server 106 provide data, such as boot files, operating system images, and applications to clients 110 and 112. Clients 110 and 112 are clients to application server 104 in this example.

Enterprise information system 114 is any type of computer system that provides information services, data storage, and/or resource management for an organization or a distributed computing system. Enterprise information system 114 may include a variety of different hardware and software resources that utilize a variety of platforms, operating systems, interfaces, and protocols to provide data and services to application server 104 and/or clients 110 and 112.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN).

Network data processing system 100 may include additional servers, clients, databases, and other devices not shown. FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A resource adapter is a system level software component that an application uses to connect to an enterprise information system, such as enterprise information system 114 in FIG. 1. The resource adapter plugs into an application server and provides connectivity between the EIS, application services, and the enterprise application components despite the differences between the software and hardware systems associated with the EIS and the application server. The resource adapter is frequently updated to a new version of the resource adapter.

Resource adapters are frequently updated to support additional EIS connectivity features, to support a new EIS version, in response to changes to the external resource configuration utilized by the resource adapter, due to improvements in resource adapter internal interfaces, in response to a request to support a newer version of a Java Connectivity Architecture (JCA), or any combination of these reasons. An example of a change to the external resource configuration utilized by the resource adapter includes, but is not limited to, a database configuration change.

In one solution to the problem of migrating resource adapters, an individual migration procedure is provided for each new resource adapter version. This solution provides a generic procedure that requires additional user documentation and software support to adjust for the differences and customizations on different computer systems.

In another solution, the resource adapter logic for a newer version of a resource adapter provides custom migration logic to carry out the migration procedure. However, the migration logic source code increases with each new resource adapter version because each newer version of the adapter may include migration logic capable of migrating older versions of the resource adapter.

In other words, if there have been four versions of a resource adapter, a newer version of the adapter includes a set of migration logic for migrating each of the older versions to the newer version. In this case, the newer resource adapter would include four versions of the migration logic for migrating version one to version five, version two to version five, version three to version five, and version four to version five. This results in the program code becoming increasingly voluminous, complex, and expensive to create.

Currently, some systems, such as Java platform enterprise edition (J2EE) are able to invoke a development tool with refactoring features. Refactoring refers to changing software to simplify the code or improve the readability of the code without altering the external function of the code. However, J2EE development tools do not share refactoring functionality standards.

Therefore, the illustrative embodiments provide a computer implemented method, apparatus, and computer usable program code for automatically migrating a resource adapter component. In one embodiment, information describing a development and runtime environment associated with a first version of a resource adapter is collected by a migration framework to form real environment information. A specification of requirements associated with a second version of the resource adapter is received from the second version of the resource adapter to form a required environment specification. The migration framework compares the real environment information with the required environment specification. In response to identifying incompatibilities between the real environment information and the required environment specification, the migration framework automatically executes a migration scenario to resolve the incompatibilities.

The migration framework permits a developer to create migration tasks for the adapter-specific migration changes. The migration tasks implement a set of changes to the application artifacts, component runtime configuration, and component runtime resources. The migration tasks implementation can be reused between resource adapter components built on the same architecture and for the same runtime environment. The developer creates a migration scenario for each new version of the resource adapter component.

A user invokes the resource adapter migration tool. Each resource adapter component is provided with the same user interface for adapters built on the same architecture and for the same runtime environment.

Figure 3:
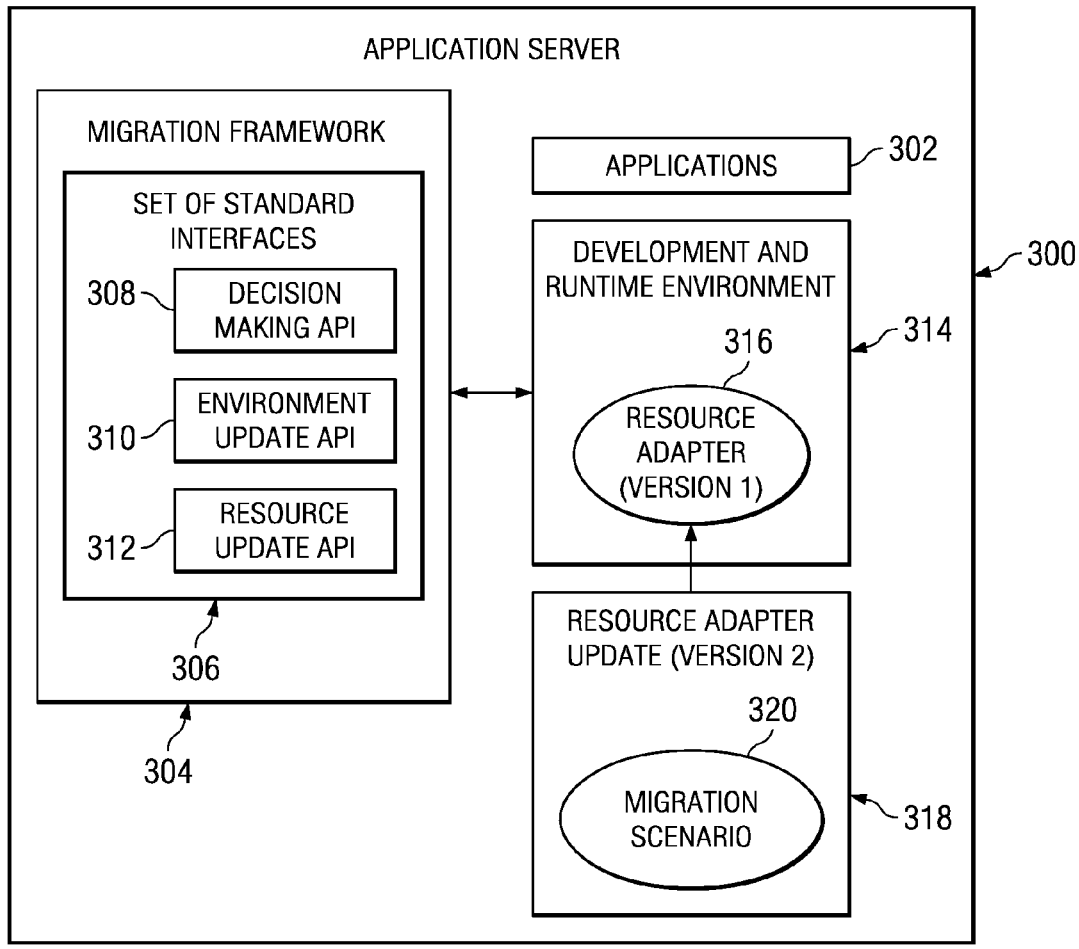
FIG. 3 is a block diagram illustrating an application server supporting a migration framework in accordance with an illustrative embodiment.

FIG. 3 is a block diagram illustrating an application server supporting a migration framework in accordance with an illustrative embodiment. Application server 300 may be implemented as a software server on any type of computing device, such as, but not limited to, a physical server device, a personal computer, a laptop, or any other computing device depicted in FIGS. 1 and 2. In this example, application server 300 is an application server, such as, application server 104 in FIG. 1.

Applications 302 are a plurality of applications and applications services provided by application server 300. Applications 302 may require data obtained from enterprise information systems, such as, enterprise information systems 114 in FIG. 1. Therefore, application server 300 includes resource adapter 316 to connect application server 300 to any available enterprise information systems.

Migration framework 304 is a common framework for a variety of software tools that automatically migrates project development and runtime artifacts to a new version of a resource adapter when the resource adapter is migrated to the new version. Migration framework 304 does not rely on any particular J2EE development tool, J2EE server, enterprise application, or resource adapter functionality. However, reuse of the migration tasks is applicable for the resource adapter components built on the same architecture and for the same runtime environment.

As used herein, the term migrate refers to upgrading, updating, changing, or otherwise modifying software code. The term artifact refers to special files that are created in development and runtime environment 314. Artifacts use cases, class diagrams, models, and/or requirements and design documents to describe the function, architecture, and design of programs created in development and runtime environment 314. In this example, the project development and runtime artifacts are J2EE artifacts in development and runtime environment 314 associated with resource adapter 316.

Migration framework 304 provides set of standard interfaces 306 for both components and tool developers associated with application server 300, such as J2EE components. Set of standard interfaces 306 includes, but is not limited to, decision making API 308, environment update API 310, and resource update API 312.

In this embodiment, migration framework 304 always implements at least two universal interfaces, the decision making API 308 and the environment update API 310. However, migration framework 304 may implement any number of interfaces in accordance with the illustrative embodiments.

Decision making API 308 is an interface between migration framework 304 and decision making and development tools that are used during the migration procedure to identify changes or differences between a new version of resource adapter 316 and resource adapter update 318. In this example, decision making API 308 communicates with a graphical user interface tool or batch processing system, such as, but not limited to, Apache ANT™ (a trademark of Apache Software Foundation Corporation).

Environment update API 310 is an interface between migration framework 304 and development and runtime environment 314. Invocation of migration framework 304 is determined by the development or runtime environment interfaces. In this example, the interface is environment update API 310. The inputs required for invocation include, but are not limited to, the original version of the resource adapter component to be upgraded to the new version and application artifacts, component runtime configuration, and runtime resources to be migrated. However, in another embodiment, migration framework 304 may provide a way to identify dependent application artifacts, component configuration, and runtime resources to be migrated for each combination of resource adapter architecture and development and runtime environment 314.

Migration framework 304 receives migration scenario 320 and resource adapter environment information through environment update API 310. The methods included in environment update API 310 are used to modify the resource adapter environment. Migration framework 304 identifies the location of migration changes and compares the requirements of the new version of the resource adapter to the current state or current environment of development and runtime environment 314. If a change to the current development and runtime environment 314 is required, the change is performed by migration framework 304 using migration logic provided by migration scenario 320.

Resource update API 312 is an interface that allows migration framework 304 to provide delta information to update development and runtime environment 314. Delta information is information generated by executing migration scenario 320. The delta information changes or updates artifacts and components of development and runtime environment 314 to make development and runtime environment 314 compatible with resource adapter update 318. In other words, the delta information provided by migration framework 304 to development and runtime environment 314 through resource update API 312 makes any changes necessary so that development and runtime environment 314 will satisfy any development and runtime environment requirements of resource adapter 316 after resource adapter 316 is updated with resource adapter update 318.

Development and runtime environment 314 is a development environment and a runtime environment associated with resource adapter 316. A development environment is a software environment that assists program developers and programmers in developing software. The development environment may include, without limitation, a source code editor, a compiler, an interpreter, and/or a debugger. A runtime environment is an environment in which software executes or runs. The runtime environment describes the operation of the software during execution of the software. Normally resource adapter 316 is replaced in the development environment and subsequently deployed to the runtime environment.

Resource adapter update 318 is an update for resource adapter 316 to update to a newer version of the resource adapter. Resource adapter update 318 includes migration scenario 320.

Migration scenario 320 describes a scenario for migrating resource adapter 316 to the new version of the resource adapter provided by resource adapter update 318. Migration scenario 320 provides a migration scenario for a previous version of resource adapter 316. In other words, migration scenario 320 is a migration descriptor that accompanies each new version of resource adapter, such as resource adapter update 318.

The format of the descriptor and all contained elements specifications are defined by migration framework 304. The descriptor contains a way to uniquely identify resource adapter components to be migrated. The descriptor may contain specification and classification of the migration changes and their subjects or a way to perform migration changes. For example, migration scenario 320 may contain a specification that specifies a name of a task interface/class/method that will implement migration changes.

Thus, if there have been two previous versions of resource adapter 316, migration scenario 320 may include two migration scenarios. One migration scenario supports migration from the first or oldest version of resource adapter 316 to the newer version. The second migration scenario, in this example, is a migration scenario for migrating from the second version to the newest version of resource adapter 316.

In one embodiment, migration scenario 320 is provided in the form of an XML document. In this example, migration framework 304 includes a universal XML schema that represents all elementary migration commands. As new versions of resource adapter 316 appear, migration framework 304 can accommodate the different migration requirements provided by migration scenario 320 associated with each newer version of resource adapter 316.

Migration scenario 320 is generated by a resource adapter developer. The resource adapter developer captures necessary migration steps, provides a migration XML document, and delegates custom migration logic commands to migration framework 304 as a pluggable module. The tool developer invokes interactive or batch decision making interface using migration scenario 320.

In other words, resource adapter developer identifies the tasks or steps that are necessary to complete the migration procedure. The resource adapter developer generates an XML document describing the migration steps that were identified. Finally, the resource adapter developer generates custom migration commands that are needed to complete the migration procedure.

When standard or reusable commands are not available, the resource adapter developer creates customized migration commands to complete the procedure. These customized migration commands are created in a pluggable module that can be plugged in to migration framework 304 for utilization during execution of the migration procedure. The resource adapter developer creates migration scenario 320 using the migration steps, the XML document describing the migration procedure, and the pluggable module having the customized migration commands.

The resource adapter developer includes migration scenario 320 in resource adapter update 318. Migration framework 304 retrieves migration scenario 320 from resource adapter update 318 when a migration procedure is invoked.

The resource adapter developer may be a software component for identifying migration steps, generating an XML document, and generating customized migration commands. However, in this example, resource adapter developer is a programmer that creates or generates resource adapter update 318.

When the migration procedure is complete, migration framework 304 outputs application artifacts, resource adapter component runtime configurations, and component runtime resources in a state as if they were originally created or configured with the new version of the resource adapter component rather than just modified to support the new version of the resource adapter.

Figure 4:
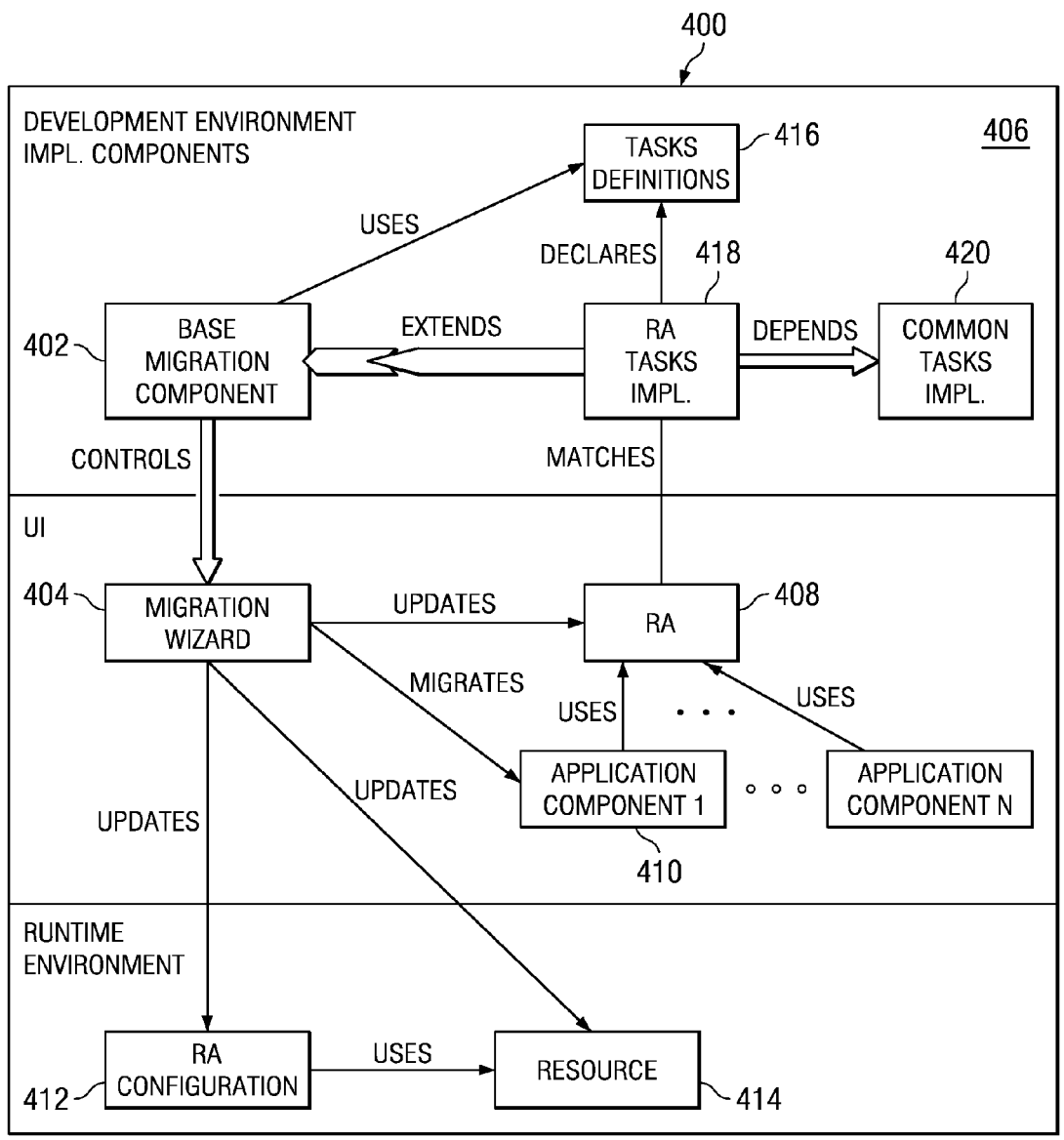
FIG. 4 is a block diagram illustrating a data flow during a resource adapter migration in accordance with an illustrative embodiment.

FIG. 4 is a block diagram illustrating a data flow during a resource adapter migration as shown in accordance with an illustrative embodiment. Development and runtime environment 400 is an environment in which a resource adapter is being upgraded to a newer version of the resource adapter.

Base migration component 402 is an extensible tool that drives the interface for collecting user input (UI) from migration wizard 404. Migration wizard 404 is a software interface for receiving user input from one or more users. Base migration component 402 is installed on the user's development environment 406 and set to update resource adapter 408 to the new version of resource adapter 408, set of artifacts of the dependent application components 410, runtime configuration 412 of resource adapter 408, and other resources utilized by resource adapter 408. The other resources utilized by resource adapter 408 include, but are not limited to, other resources 414, such as databases and data storage devices.

Base migration component 402 has an extension point that is extended by a resource adapter tool to provide the migration mechanism. While multiple resource adapter tools can provide an extension, in this example, base migration component 402 matches the resource adapter tool with resource adapter 408 in the user's environment and performs the correct migration. Base migration component 402 matches the correct resource adapter tool extension by the resource adapter name and version. The resource adapter name and version are parameters of the extension of base migration component 402.

Base migration component 402 and its extensions have versions. When they are installed in the tools environment, multiple versions of base migration component 402 can be supported in development environment 406.

Resource adapter tools specify a list of migration tasks 416 to be performed on the user environment. Tasks 416 are migration steps to be performed during migration of resource adapter 408 to the new version of resource adapter 408. The structure and format of the tasks specification is defined by base migration component 402. The list of tasks 416 defines the tasks order and specifies task implementations classes. Task implementation classes are provided by individual resource adapter extensions 418. When base migration component 402 processes resource adapter extensions, base migration component reads in definitions of tasks 416 and configures the user interface to collect user input required by tasks 416. When all the required input is collected from the user, the migration tool executes the tasks on the user resources.

Common task implementations 420 can exist between different adapters that are built on the same architecture and intended for the same runtime environment. In this case, resource adapter tools may import common task implementation 420 classes and specify them in the definitions of tasks 416.

Work of a general nature, such as, but not limited to, loading, updating, and saving resources, is implemented in the layer that is reused by the resource adapter tools. Base migration component 402 implements processes associated with how artifacts configurations and resources are migrated. The resource adapter extension tools implement processes associated with what artifacts are migrated.

Figure 5:
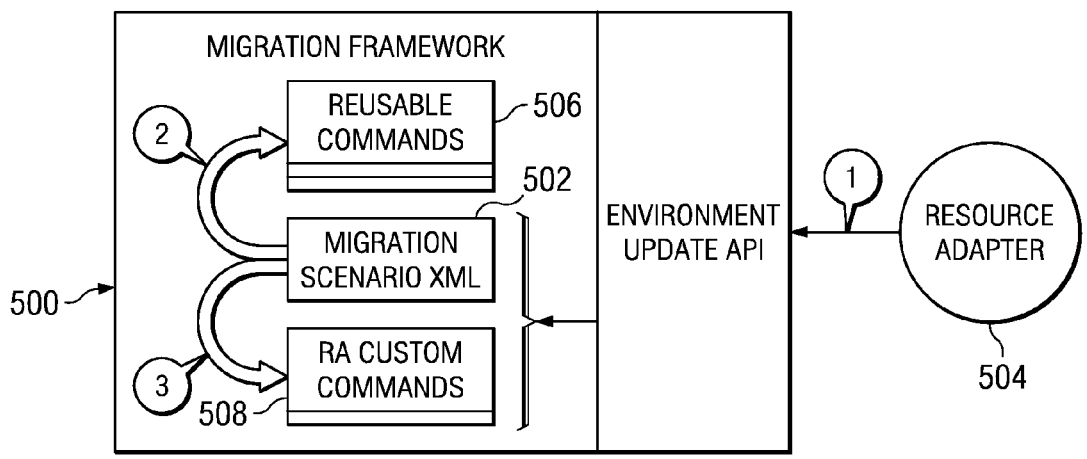
FIG. 5 is a block diagram illustrating a migration framework for invoking standard and custom migration logic in accordance with an illustrative embodiment.

FIG. 5 is a block diagram illustrating a migration framework for invoking standard and custom migration logic in accordance with an illustrative embodiment. Migration framework 500 is a migration framework for providing an extensible mechanism to automatically migrate resource adapter components in a development environment, such as, migration framework 304 in FIG. 3. In this example, migration framework 500 executes atomic migration commands, as well as complex migration sequences.

Migration framework 500 receives a migration scenario and pluggable commands from resource adapter 504. The migration scenario is a scenario for updating a resource adapter from one version of the resource adapter to a different version of the resource adapter.

In this example, the migration scenario is provided to migration framework 500 in an XML document. The migration scenario can include multiple migration scenarios for updating multiple older versions of the resource adapter to the newer version. In other words, if resource adapter 504 has two older versions, the migration scenario includes two migration scenarios. One migration scenario is provided for migrating the first version to the new version and a second migration scenario is provided for migrating the second version to the new version.

Migration framework 500 executes the migration scenario associated with the current version of resource adapter 504 that is being updated to the new version. During execution of the migration scenario, migration framework 500 invokes reusable commands 506. Reusable commands 506 are migration logic for performing migration tasks that are predefined and already available to migration framework 500. Reusable commands 506 are not required to be provided to migration framework 500 in the migration scenario. In other words, for a set of resource adapter components built on the same architecture and for the same development and runtime environment, a set of migration changes could be common from release to release. A set of common release-to-release migration changes specification or a way to perform them are support by migration framework 500 and are made available for the individual resource adapter components to reuse as reusable commands 506.

Migration framework 500 also invokes resource adapter specific, custom commands 508 that are referred to in the migration scenario. Custom commands 508 are migration commands that are generated by the resource adapter developer for a particular update of resource adapter 504. Custom commands 508 are provided to migration framework 500 in the migration scenario. Custom commands 508, unlike reusable commands 506, are not predefined in migration framework 500. Therefore, migration framework 500 requires resource adapter 504 to provide custom commands 508 in the migration scenario for utilization in executing the migration scenario.

In this example, custom commands 508 are provided to migration framework 500 as a pluggable module of customized migration logic commands that plug in to migration framework 500. Migration framework 500 automatically plugs in the pluggable module of resource adapter specific custom commands 508.

Custom commands 508 may become reusable for the next migration scenario. In other words, after utilization of custom commands 508 during execution of the migration scenario, migration framework 500 saves custom commands 508 in reusable commands 506 for utilization in future migration procedures. Thus, each time migration framework 500 receives new custom commands 508, migration framework 500 adds the new custom commands to the commands in reusable commands 506. This process increases the predefined, reusable commands in reusable commands 506 available to migration framework 500.

Referring now to FIG. 6, a block diagram illustrating a migration framework for confirming migration is not required is shown in accordance with an illustrative embodiment. Migration framework 600 is a migration framework for providing an extensible mechanism to automatically migrate resource adapter components in a development environment, such as, migration framework 304 in FIG. 3.

Migration framework 600 collects real environment information 606 at 602. Real environment information 606 is information describing the actual, current, or real environment of resource adapter 604. For example, and without limitation, real environment information 606 includes information regarding the development environment, the deployment configuration environment, and/or the runtime environment. In this manner, migration framework 600 verifies the environment around resource adapter 604.

Migration framework 600 then requests 608 a specification of the environment required by the new version of resource adapter 604 to form required environment specification 610. Migration framework 600 uses methods associated with an environment update interface, such as environment update API 310 in FIG. 3, to receive required environment specification 610 from resource adapter 604 and collect real environment information 606.

Migration framework 600 then compares real environment information 606 with required environment specification 610 to determine if any incompatibilities exist between real environment information 606 and required environment specification 610. In other words, if there are any differences between real environment specification 606 and required environment specification 610 the real environment is incompatible with the updated version of resource adapter 604 and a migration procedure will be required to resolve the incompatibilities. If no incompatibilities are detected, then the real environment is compatible with the updated version of resource adapter 604 and a migration procedure will not be required.

Figure 7:
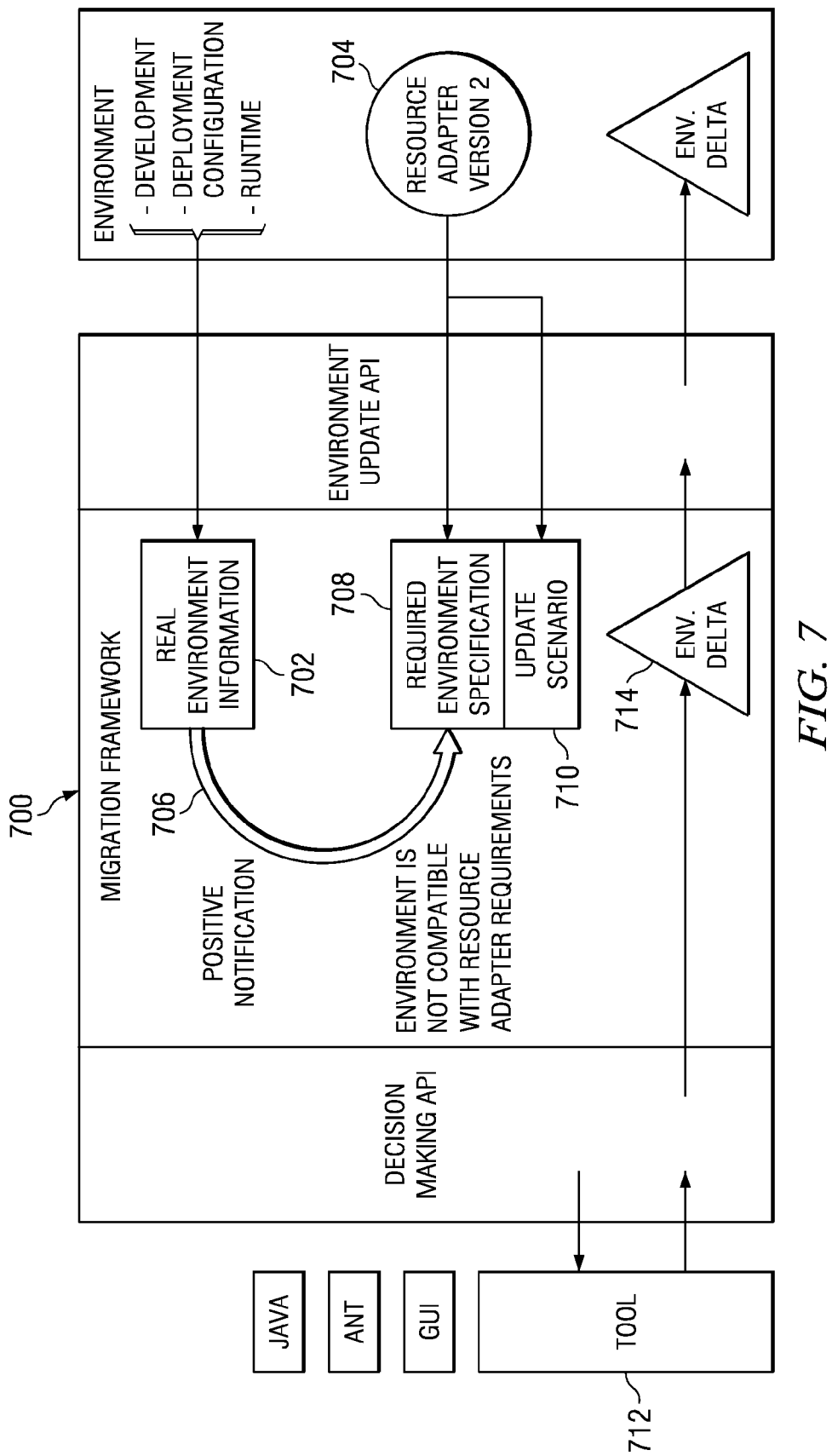
FIG. 7 is a block diagram illustrating a migration framework for detecting a required migration in accordance with an illustrative embodiment.

FIG. 7 is a block diagram illustrating a migration framework for detecting a required migration in accordance with an illustrative embodiment. Migration framework 700 is a migration framework for providing an extensible mechanism to automatically migrate resource adapter components in a development environment, such as, migration framework 304 in FIG. 3.

In this example, an older version of a resource adapter was replaced with a newer version of the resource adapter, resource adapter 704. Migration framework 700 collects real environment information 702 describing the current development environment, runtime environment, and/or deployment configuration associated with resource adapter 704. Real environment information 702 is information describing the development and runtime environment, such as real environment information 606 in FIG. 6.

Migration framework 700 requests required environment specification 708 from resource adapter 704. Required environment specification 708 is a specification of the requirements of the resource adapter 704, which is a newer version of an original resource adapter. Required environment specification 708 is a specification such as, required environment specification 610 in FIG. 6.

Migration framework 700 compares required environment specifications 708 that is required by updated resource adapter 704 with real environment information 702. In this example, migration framework 700 detects incompatible elements. In other words, migration framework 700 detects some development and runtime environment elements that do not match the required specification received from updated resource adapter 704 at 706.

In this example, the incompatibilities between the real environment and the required environment would not result in an application producing compilation or deployment errors. However, the incompatibilities could result in runtime problems in which resource adapter 704 invokes incompatible environment elements, such as, but not limited to, a configuration file.

Migration framework 700 requests a migration scenario from resource adapter 704. The migration scenario 710 is a scenario for migrating the development and runtime environment automatically, such as, but not limited to, migration scenario 320 in FIG. 3. Migration framework 700 executes the migration scenario and invokes migration tool 712 to resolve incompatibilities between the real development and runtime environment and required environment specification.

Migration framework 700 communicates with migration tool 712 through decision making API, such as decision making API 308 in FIG. 3. In response, migration tool 712 provides resolved elements and update decisions to migration framework 700. Migration framework 700 uses the resolved elements and update decisions to collect environment delta 714 information.

Migration framework 700 updates the resource adapter development and runtime environment by uploading environment delta to resource adapter development project and deployed enterprise application archive (EAR) runtime artifact via a resource update interface, such as resource update API 312 in FIG. 3.

Thus, migration framework 700 operates like a service within an application server and updates deployed resource adapters. Migration framework 700 is installed as a pluggable feature in development tools to update application project components, enterprise information systems artifacts, and deployed applications environments, such as, but not limited to, J2EE applications environment and J2EE application project components.

FIG. 8 is a flowchart illustrating a process for generating a migration scenario in accordance with an illustrative embodiment. The process in FIG. 8 is implemented by a resource adapter developer.

The process begins by identifying any necessary migration steps (step 802) such as tasks 416 in FIG. 4. The process generates a migration XML document (step 804). The process generates customized migration logic commands in the form of a pluggable module that plugs into the migration framework (step 806). The process then generates a migration scenario for each older version of the resource adapter using the migration steps, the XML document, and the pluggable module of custom migration logic commands (step 808) with the process terminating thereafter.

Turning now to FIG. 9, a flowchart illustrating a process for invoking the migration framework is depicted in accordance with an illustrative embodiment. The process in FIG. 9 is implemented by a migration framework, such as migration framework 304 in FIG. 3.

The process receives input identifying the original version of the resource adapter component that is to be upgraded to a new version (step 902). The process receives input identifying application artifacts, component runtime configurations, and runtime resources to be migrated (step 904). The process then invokes the migration tool to begin the migration procedure (step 906) with the invocation process terminating thereafter.

Figure 10:
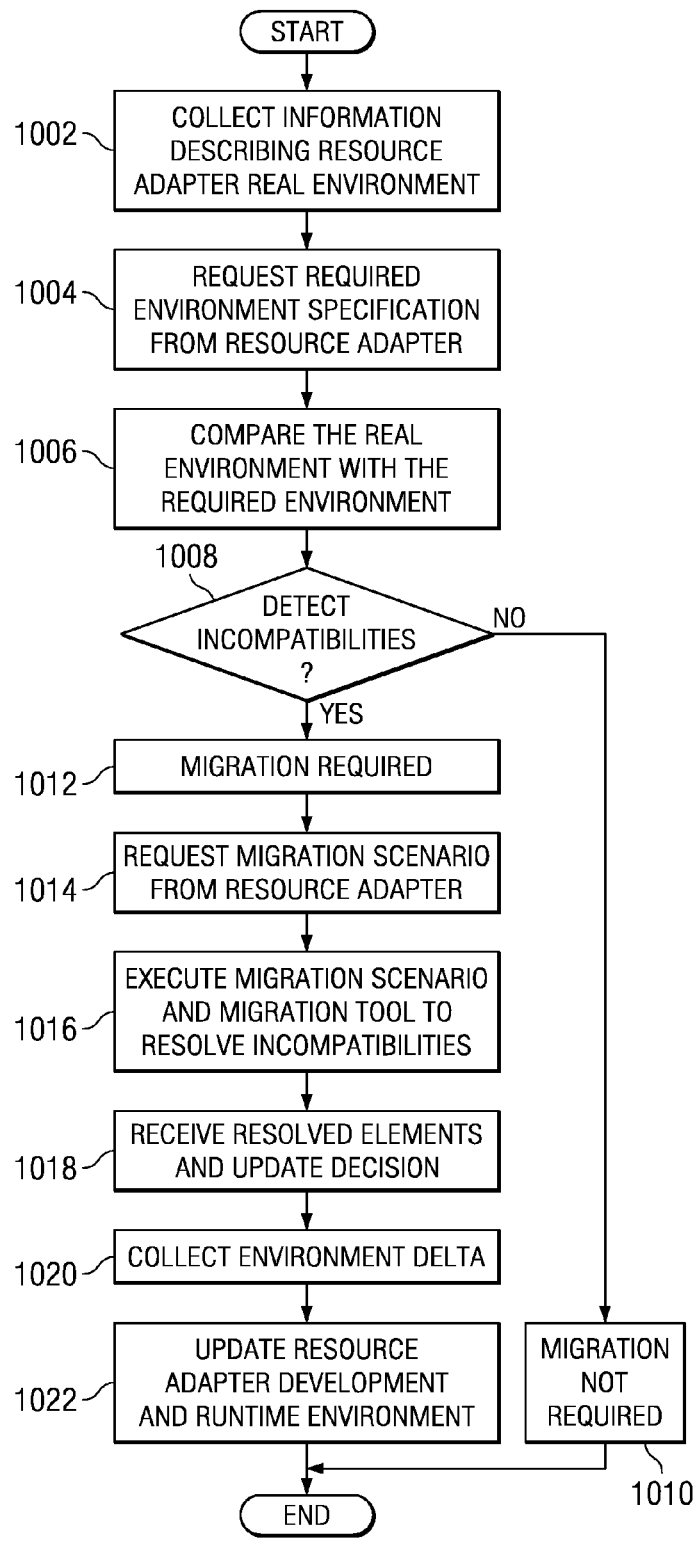
FIG. 10 is a flowchart illustrating a process for migrating resource adapter components by the migration framework in accordance with an illustrative embodiment.

FIG. 10 is a flowchart illustrating a process for migrating resource adapter components by the migration framework in accordance with an illustrative embodiment. The process in FIG. 10 is implemented by a migration framework, such as migration framework 304 in FIG. 3.

The process begins by collecting information describing resource adapter real environment, such as development and runtime environment 314 in FIG. 3 (step 1002). The process requests a required environment specification from the resource adapter, such as required environment specification 610 in FIG. 6 (step 1004). The process compares the real environment with the required environment specification (step 1006).

The process then makes a determination as to whether any incompatibilities exist between the real environment and the required environment specification (step 1008). If a comparison of the real environment with the required environment indicates that there are no incompatibilities ("no" branch), the process determines that migration is not required (step 1010) and the process terminates thereafter.

Returning to step 1008, if the process determines that discrepancies or incompatibilities do exist between the real environment and the environment required by the new version of the resource adapter, the process determines that migration is required to resolve the incompatibilities (step 1012). The process requests a migration scenario from the resource adapter (step 1014). The process then executes the migration scenario corresponding to the previous version of the resource adapter and migration tools to resolve the incompatibilities (step 1016).

The process receives resolved elements and update decisions from the migration tools (step 1018). The process then collects environment delta information to update the development and runtime environment (step 1020). The process updates the resource adapter development and runtime environment (step 1022) with the process terminating thereafter.

Figure 11:
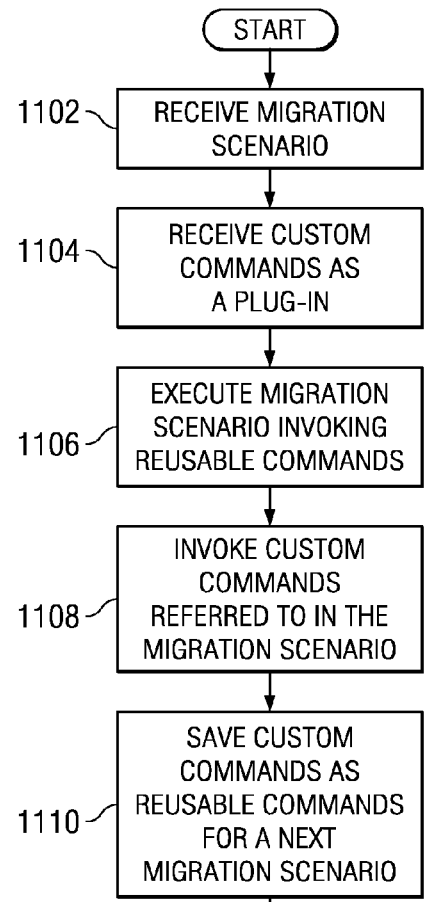
FIG. 11 is a flowchart illustrating a process for executing a migration scenario by the migration framework in accordance with an illustrative embodiment.

FIG. 11 is a flowchart illustrating a process for executing a migration scenario by the migration framework in accordance with an illustrative embodiment. The process in FIG. 11 is implemented by a migration framework, such as migration framework 304 in FIG. 3. The process in FIG. 11 is a more detailed description of step 1016 in FIG. 10.

The process begins by receiving the migration scenario from the resource adapter (step 1102). If more than one migration scenario is present, the process identifies the migration scenario that corresponds to the previous version of the resource adapter that is being updated with the new version of the resource adapter. Thus, if a version 1 resource adapter is being updated with a version 3 resource adapter, the process identifies the migration scenario that corresponds to migration version 1 to version 3 of the resource adapter. The process disregards the migration scenario for updating version 2 to version 3 of the resource adapter.

The process receives custom commands as a plug-in provided in the migration scenario (step 1104). The process executes the migration scenario and invokes reusable commands as needed to execute the migration scenario (step 1106). The process also invokes the custom commands referred to in the migration scenario as needed using the custom commands provided in the plug-in module (step 1108). After execution of the migration scenario is complete, the process saves the custom commands as reusable commands for utilization during execution of any future migration scenarios (step 1110) with the process terminating thereafter.

The illustrative embodiments provide a computer implemented method, apparatus, and computer usable program code for automatically migrating a resource adapter component. In one embodiment, information describing a development and runtime environment associated with a first version of a resource adapter is collected by a migration framework to form real environment information. A specification of requirements associated with a second version of the resource adapter is received from the second version of the resource adapter to form a required environment specification. The migration framework compares the real environment information with the required environment specification. In response to identifying incompatibilities between the real environment information and the required environment specification, the migration framework automatically executes a migration scenario to resolve the incompatibilities.

The illustrative embodiments isolate migration logic from resource connectivity functions and avoid performing generic procedures on the customer environment. The process provides a universal way to migrate both the development and runtime environment, standardize the migration decision process, and make the migration decision process flexible.

In addition, the process provides an extensible mechanism for automatically migrating resource adapter components in a development environment, isolates migration logic from resource connectivity functions, and avoids performing generic procedures on a customer environment. The process provides a universal way to migrate both development and runtime environments and makes migration decision processes standard and flexible. The migration framework is a common framework for verifying tools that automatically migrate project development and runtime artifacts to the new version of a resource adapter, allowing the framework to execute atomic migration commands and complex migration sequences using universal XML schema to present all elementary migration commands.

The migration framework enables the newer resource adapter to provide an XML document with migration scenarios for each supported previous version of the resource adapter and allows for the same migration framework to accommodate different migration requirements. Thus, the same migration framework may be used to update multiple different versions of the resource adapter as newer versions become available without requiring changes or alterations to the migration framework.

The migration framework provides a set of standard interfaces for both resource adapter developers and tool developers. The resource adapter developer can capture the necessary migration steps, provide migration XML documents, and delegate custom migration logic to the migration framework as a pluggable module. This allows the migration framework developer to invoke interactive or batch decision making interfaces.

The migration framework utilizes both standard migration commands and adapter-specific customized commands. The migration framework is able to handle multiple different migration scenarios, confirm that a migration procedure is not required for a new version of a resource adapter, as well as determine when a migration procedure is required to update a resource adapter to a newer version.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically migrating a resource adapter component, the computer implemented method comprising:
   collecting information describing a development and runtime environment associated with a first version of a resource adapter, by a migration framework, to form real environment information;
   receiving a specification of requirements associated with a second version of the resource adapter from the second version of the resource adapter to form a required environment specification;
   comparing, by the migration framework, the real environment information with the required environment specification; and
   responsive to identifying incompatibilities between the real environment information and the required environment specification, invoking the migration framework to automatically execute a migration scenario to resolve the incompatibilities.

2. The computer implemented method of claim 1 further comprising:
   responsive to a failure to detect incompatibilities between the real environment information and the required environment specification, determining that performing a migration of the resource adapter is unnecessary.

3. The computer implemented method of claim 1 wherein invoking the migration framework to automatically execute the migration scenario to resolve the incompatibilities further comprises:
   requesting a set of migration scenarios from the second version of the resource adapter; and
   identifying the migration scenario in the set of migration scenarios that corresponds to a migration of the first version of the resource adapter to the second version of the resource adapter to form a selected migration scenario.

4. The computer implemented method of claim 3 further comprising:
   executing the selected migration scenario by the migration framework; and
   updating the development and runtime environment using a result of executing the selected migration scenario, by the migration framework, to form a migrated development and runtime environment, wherein the migrated development and runtime environment is compatible with the second version of the resource adapter.

5. The computer implemented method of claim 1 further comprising:
   executing, by the migration framework, the migration scenario, wherein executing the migration framework further comprises:
   retrieving a set of customized commands associated with the second version of the resource adapter; and
   executing the migration scenario using the set of customized commands and a set of reusable commands, wherein the reusable commands are predefined commands associated with the migration framework.

6. The computer implemented method of claim 5 wherein the set of customized commands are resource adapter specific, migration logic provided by the second version of the resource adapter.

7. The computer implemented method of claim 1 further comprising:
   receiving a pluggable module from the second version of the resource adapter, wherein the pluggable module comprises a set of customized commands, wherein the customized commands are utilized during migration of the first version of the resource adapter to the second version of the resource adapter.

8. The computer implemented method of claim 1 wherein the migration framework is a software component that provides a common framework for a variety of migration tools to automatically update the first version of the resource adapter to the second version of the resource adapter without intervention by a human user.

9. The computer implemented method of claim 5 further comprising:

saving the set of customized commands in the set of reusable commands to form an updated set of reusable commands, wherein the set of updated reusable commands are utilized during execution of a next migration scenario.

10. A computer program product comprising:

a computer usable medium including computer usable program code for automatically migrating a resource adapter component, said computer program product comprising:

computer usable program code for collecting information describing a development and runtime environment associated with a first version of a resource adapter, by a migration framework, to form real environment information;

computer usable program code for receiving a specification of requirements associated with a second version of the resource adapter from the second version of the resource adapter to form a required environment specification;

computer usable program code for comparing, by the migration framework, the real environment information with the required environment specification; and computer usable program code for invoking the migration framework to automatically execute a migration scenario to resolve incompatibilities in response to identifying the incompatibilities between the real environment information and the required environment specification.

11. The computer program product of claim 10 further comprising:

computer usable program code for determining that performing a migration of the resource adapter is unnecessary in response to a failure to detect incompatibilities between the real environment information and the required environment specification.

12. The computer program product of claim 10 further comprising:

computer usable program code for requesting a set of migration scenarios from the second version of the resource adapter; and computer usable program code for identifying the migration scenario in the set of migration scenarios, wherein the migration scenario corresponds to a migration of the first version of the resource adapter to the second version of the resource adapter to form a selected migration scenario.

13. The computer program product of claim 12 further comprising:

computer usable program code for executing the selected migration scenario by the migration framework; and computer usable program code for updating the development and runtime environment using a result of executing the selected migration scenario, by the migration framework, to form a migrated development and runtime environment, wherein the migrated development and runtime environment is compatible with the second version of the resource adapter.

14. The computer program product of claim 10 further comprising:

computer usable program code for executing, by the migration framework, the migration scenario, wherein executing the migration framework further comprises:

computer usable program code for retrieving a set of customized commands associated with the second version of the resource adapter; and computer usable program code for executing the migration scenario using the set of customized commands and a set of reusable commands, wherein the reusable commands are predefined commands associated with the migration framework.

15. The computer program product of claim 14 wherein the set of customized commands are resource adapter specific, migration logic associated with the second version of the resource adapter.

16. The computer program product of claim 10 further comprising:

computer usable program code for receiving a pluggable module from the second version of the resource adapter, wherein the pluggable module comprises a set of customized commands, and wherein the customized commands are utilized during migration of the first version of the resource adapter to the second version of the resource adapter.

17. A system for automatically migrating a resource adapter component, the system comprising:

a development and runtime environment associated with a first version of a resource adapter;

a second version of the resource adapter; and a migration framework, wherein the migration framework collects information describing the development and runtime environment associated with the first version of the resource adapter to form real environment information; receives a specification of requirements associated with the second version of the resource adapter from the second version of the resource adapter to form a required environment specification; compares the real environment information with the required environment specification; and executes a migration scenario to automatically resolve the incompatibilities.

18. The system of claim 17 wherein the second version of the resource adapter further comprises:

a set of migration scenarios, wherein each migration scenarios in the set of migration scenarios comprises migration logic for automatically migrating an original version of a resource adapter to a newer version of the resource adapter, and wherein the migration framework identifies a migration scenario in the set of migration scenarios that corresponds to a migration of the first version of the resource adapter to the second version of the resource adapter to form a selected migration scenario, and wherein the migration framework executes the selected migration scenario.

19. The system of claim 17 further comprising:

a migration tool, wherein the migration tool is invoked in response to executing the migration scenario, and wherein the migration tool provides resolved elements and update decisions to the migration framework for utilization in resolving the incompatibilities.

20. The system of claim 17 further comprising:

a set of interfaces associated with the migration framework, wherein the set of interfaces comprises:

an environment update interface, wherein the environment update interface provides an interface between the migration framework and the resource adapter; and a decision making interface, wherein the decision making interface provides an interface between the migration framework and a set of decision making and development tools that are used during execution of the migration scenario.

* * * * *